(12) United States Patent
Trieb

(10) Patent No.: US 7,571,803 B2
(45) Date of Patent: Aug. 11, 2009

(54) BEARING UNIT FOR A CONVEYING INSTALLATION FOR THE TRANSPORT OF GOODS BY WAY OF A CONVEYOR BELT

(75) Inventor: Herbert Trieb, Lochau (AT)

(73) Assignee: Innova Patent GmbH, Wolfurt (AT)

( * ) Notice: Subject to any disclaimer, the term of this patent is extended or adjusted under 35 U.S.C. 154(b) by 26 days.

(21) Appl. No.: 11/961,240

(22) Filed: Dec. 20, 2007

(65) Prior Publication Data

US 2009/0026045 A1 Jan. 29, 2009

(30) Foreign Application Priority Data

Jul. 24, 2007 (AT) .............................. A 1173/2007

(51) Int. Cl.
*B65G 39/20* (2006.01)
(52) U.S. Cl. ........................ 198/845; 198/817; 198/818
(58) Field of Classification Search ................ 198/845, 198/817, 818, 828, 850
See application file for complete search history.

(56) References Cited

U.S. PATENT DOCUMENTS

| 3,490,773 | A | * | 1/1970 | Dennison | .................... 198/845 |
| 3,530,799 | A | * | 9/1970 | Braun | ......................... 198/845 |
| 4,674,627 | A | * | 6/1987 | Dussan V. | .................... 198/845 |
| 5,791,454 | A | * | 8/1998 | Trieb | .......................... 198/838 |
| 6,588,583 | B2 | * | 7/2003 | Trieb | .......................... 198/845 |
| 6,935,490 | B2 | | 8/2005 | Trieb | |

FOREIGN PATENT DOCUMENTS

EP 1452466 A1 9/2004

* cited by examiner

*Primary Examiner*—James R Bidwell
(74) *Attorney, Agent, or Firm*—Laurence A. Greenberg; Werner H. Stemer; Ralph E. Locher

(57) ABSTRACT

A bearing unit for a conveying installation for the transport of goods by way of a conveyor belt that is guided at the two ends of the installation by deflection drums and which is fastened to the underside of spaced-apart, transverse carrying beams. Running rollers are mounted to the two ends of the carrying beams. The rollers are mounted on bearing journals and they roll along two pairs of carrying ropes or carrying rails of the conveying installation along a forward and a return strand of the conveyor belt. A bearing bolt of the bearing units has an extension which is fastened releasably to the assigned carrying beam. The extension is an upwardly open trough, onto which the assigned end of the carrying beam is placed and releasably fastened.

4 Claims, 4 Drawing Sheets

US 7,571,803 B2

BEARING UNIT FOR A CONVEYING INSTALLATION FOR THE TRANSPORT OF GOODS BY WAY OF A CONVEYOR BELT

CROSS-REFERENCE TO RELATED APPLICATION

This application claims the priority, under 35 U.S.C. § 119, of Austrian application A1173/2007, filed Jul. 24, 2007; the prior application is herewith incorporated by reference in its entirety.

BACKGROUND OF THE INVENTION

Field of the Invention:

The present invention relates to a bearing unit for a conveying installation for the transport of goods by way of a conveyor belt, which is guided at the two ends of the installation by deflection drums and which is fastened to the underside of carrying beams oriented transversely with respect to the direction of movement of the conveyor belt and located at a distance from one another in the direction of movement of the conveyor belt. Carrying rollers are provided in each case at the two ends of the carrying beams which are mounted on bearing journals and which roll along two pairs of carrying ropes or carrying rails of the conveying installation which are assigned to the forward and to the return strand of the conveyor belt. The bearing bolt of the respective bearing unit is designed with an extension which is fastened releasably to the assigned end of the carrying beam.

In conveying installations of this type, which are known, for example, from my earlier, commonly assigned U.S. Pat. No. 6,935,490 B2 and its counterpart European published patent application EP 1 452 466 A1, the carrying beams are designed on their end faces with bores, into which a bolt-shaped extension projecting from the bearing journal of the bearing unit can be inserted and is fastened to the carrying beam by means of screw bolts. Insofar as there is the need to exchange a bearing unit, the screw bolts have to be removed and the extension projecting from the bearing journal has to be drawn out of the bore provided in the carrying beam.

However, this known fastening of the bearing units to the carrying beams does not conform to requirements since the bolt-like extensions, inserted into the carrying beams, of the bearing journals, or the screw bolts, are subject to pronounced corrosions, and therefore difficulties may arise in releasing the fastenings present between the carrying beams and the extensions, so that the bearing units can be removed from the carrying beams and replaced by new bearing units.

SUMMARY OF THE INVENTION

The object on which the present invention is based, therefore, is to provide a bearing unit for a conveying installation for the transport of goods by means of a conveyor belt, in which bearing unit the fastening of the bearing units to the carrying beams is designed such that it can be released in a simple way at any time, even under unfavorable conditions.

With these and other objects in view there is provided, in accordance with the invention, a bearing unit assembly for a conveying installation for the transport of goods by way of an endless conveyor belt that is fastened to an underside of carrying beams oriented transversely with respect to a direction of movement of the conveyor belt and spaced apart from one another in the direction of movement of the conveyor belt, comprising:

carrying rollers mounted on bearing journals at each of the two ends of the carrying beams, the carrying rollers rolling along two pairs of carrying ropes or carrying rails of the conveying installation defining a forward strand and a return strand of the conveyor belt;

the bearing journal having an extension formed as an upwardly open trough releasably fastened to, and cradling, a respective end of a corresponding carrying beam.

In other words, the objects of the invention are achieved in that the extension is designed as an upwardly open trough, onto which the assigned end of the carrying beam can be placed and is fastened releasably to this.

Preferably, the carrying beam has a hexagonal design in cross section, and the inner face of the trough-like extension has an approximately trapezium-like design in cross section. Further, preferably, the trough-like extension is offset with respect to the bearing journal in such a way that the bearing axis and the center axis of the carrying beam are at least approximately coaxial. Further, preferably, the end of the carrying beam is connected to the trough-like extension by means of screw bolts.

Other features which are considered as characteristic for the invention are set forth in the appended claims.

Although the invention is illustrated and described herein as embodied in bearing unit for a conveying installation for the transport of goods by means of a conveyor and, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
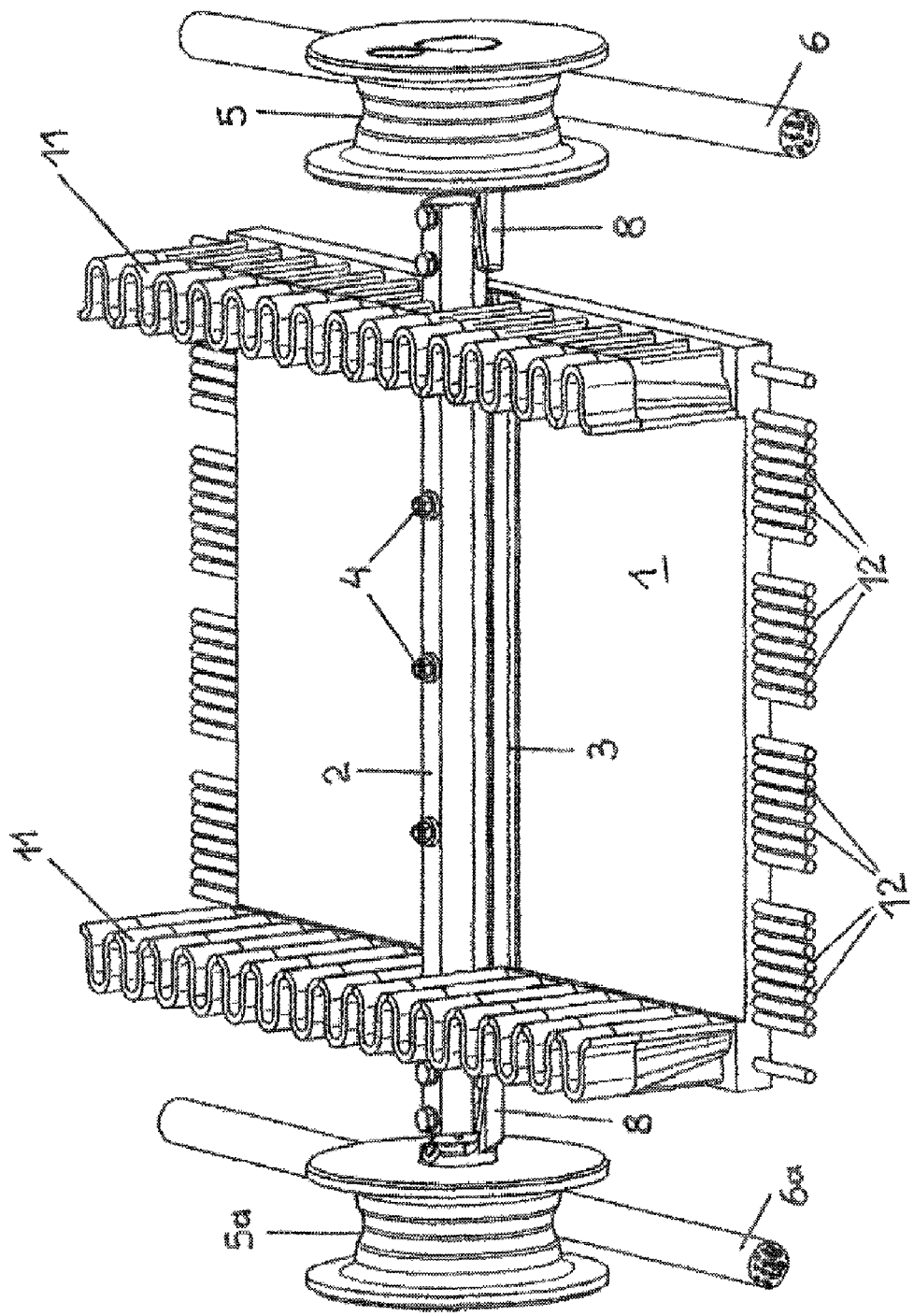
FIG. 1 is an axonometric view of a portion of a transport installation with bearing units according to the invention.

Referring now to the figures of the drawing in detail and first, particularly, to FIG. 1 thereof, there is illustrated a portion of the conveyor belt 1 in a conveying installation for the transport of goods. The conveyor belt 1 is configured at its two lateral margins with corrugated edges 11 which make it possible to guide the conveyor belt at the two ends of the conveying installation by deflection drums. As is evident, further, from this, the conveyor belt 1 is designed with a multiplicity of reinforcing ropes 12 which are located closely next to one another and by virtue of which said conveyor belt has high carrying capacity. The conveyor belt 1 is fastened to the underside of carrying beams 2 extending transversely with respect to its direction of movement, an elastic sealing strip 3 being located in each case between the conveyor belt 1 and the carrying beams 2. The fastening of the conveyor belt 1 to the carrying beams 2 takes place, for example, by means of screws 4 passing through the conveyor belt 1 and the carrying beams 2. The sealing strips 3 located between the conveyor belt 1 and the carrying beams 2 avoid the situation where, between the conveyor belt 1 and the carrying beams 2, in each case gaps are formed, into which goods to be conveyed penetrate, with the result that the conveyor belt 1 is subject to increased wear.

Running rollers 5 and 5a are disposed at the two ends of the carrying beams 2. The running rollers 5, 5a are guided along a pair of carrying ropes 6 and 6a or of carrying rails. In this case, both that strand of the conveyor belt 1 which is laden with goods to be transported and the unladen strand of the conveyor belt 1 are assigned in each case a pair of carrying ropes 6 and 6a or of carrying rails, along which the conveyor belt 1 is moved in rotation between the deflection or drive drums located in the end stations.

The fastening of the running rollers 5 and 5a to the carrying beams 2 is effected by extensions 8 of the bearing units. The extensions 8 are fastened to the assigned ends of the carrying beams 2.

Figure 2:
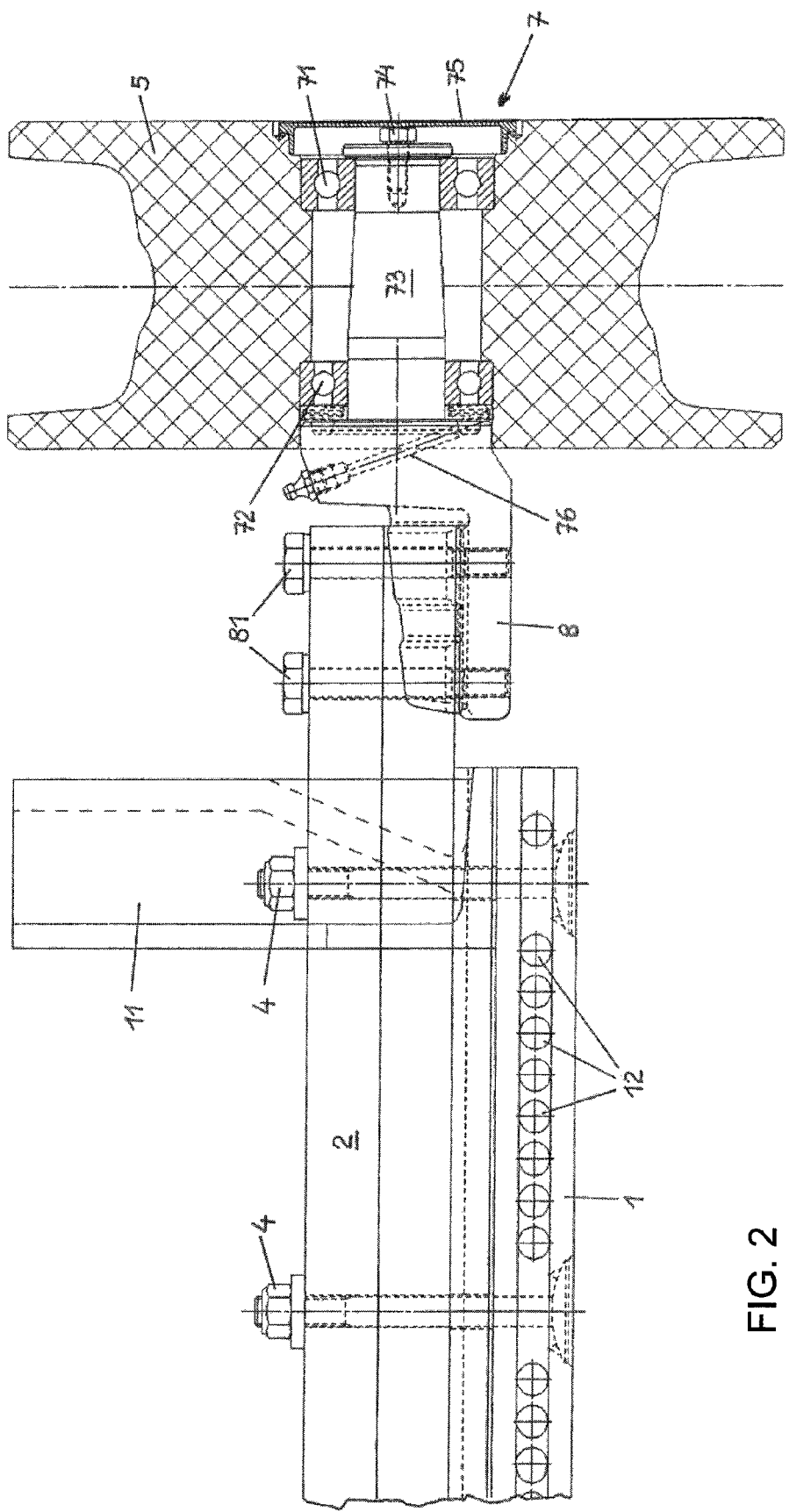
FIG. 2 is a side view, partially in section, showing a bearing unit according to the invention.

Referring now to FIG. 2, the running rollers 5 and 5a are assigned in each case a bearing unit 7 which consists of two bearing rings 71 and 72 located within the running rollers 5 and 5a and of a bearing journal 73 or bearing bolt 73 inserted into these bearing rings 71 and 72. The bearing bolt 73 is secured axially by means of a securing screw 74 which is covered by a cap 75. Moreover, a duct 76 for the supply of a lubricant is located in the bearing bolt 73. The bearing bolt 73 is designed with the axially projecting extension 8 which is designed as an upwardly open trough, its inner face being designed oppositely and identically to the outer face of the lower part of the carrying beam 2. In this case, the assigned end of the respective carrying beam 2 is inserted from above into the extension 8 of trough-like design and is fastened in the latter by means of two screws 81 which pass through the free end of the carrying beam 2 and are screwed into the extension 8.

To release this fastening so that the bearing unit 7 can be removed, the two screws 81 are removed, whereupon the extension 8 can be moved downward away from the carrying beam 2.

By virtue of this type of fastening of the bearing unit 7 to the carrying beam 2, the disadvantages appertaining to the known prior art in the fastening of the bearing units 7 to the carrying beams 2 are avoided.

Figure 3:
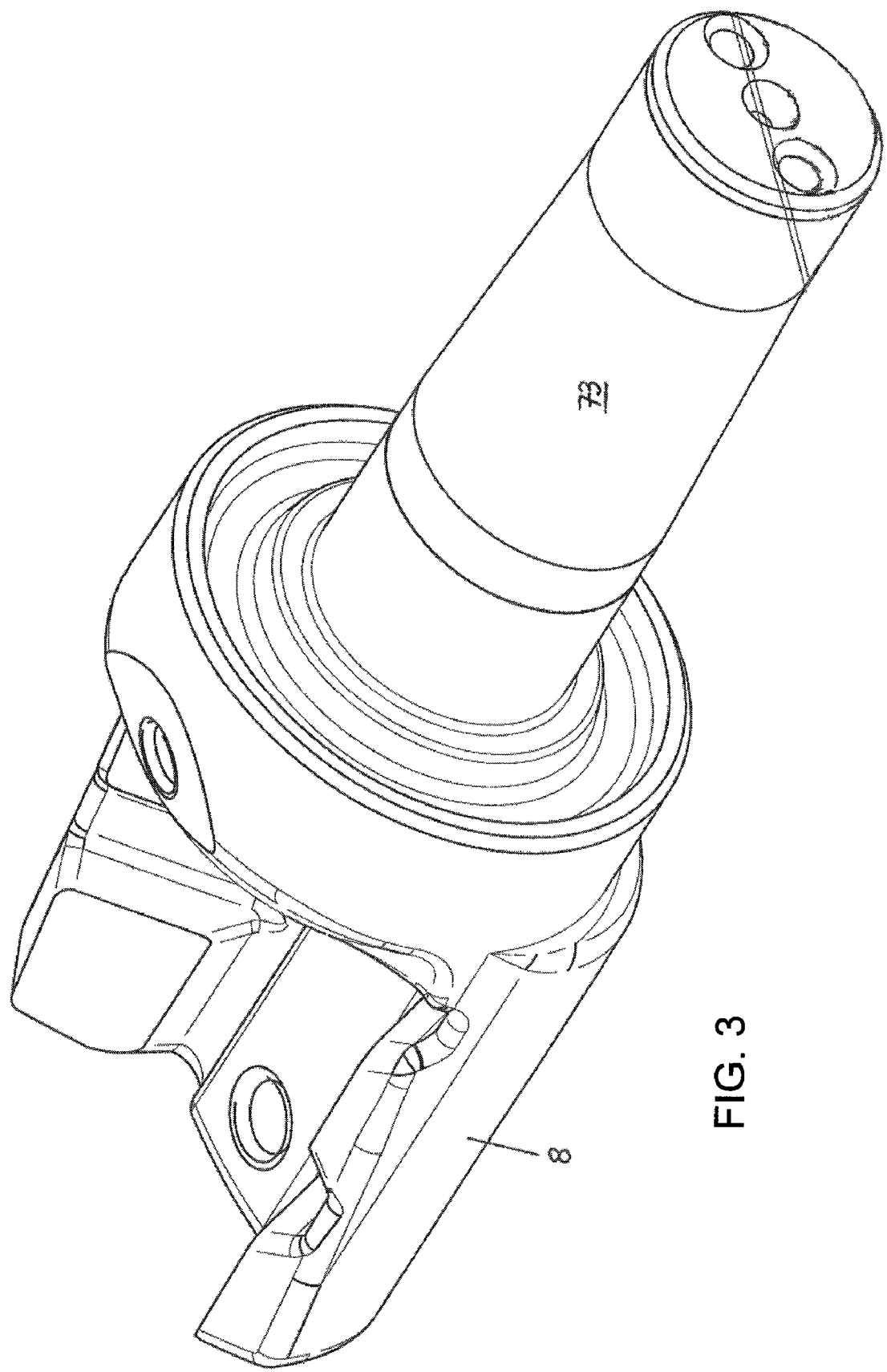
FIG. 3 is an axonometric view of the bearing journal, designed with an extension according to the invention, of a bearing unit according to the invention.
Figure 3A:
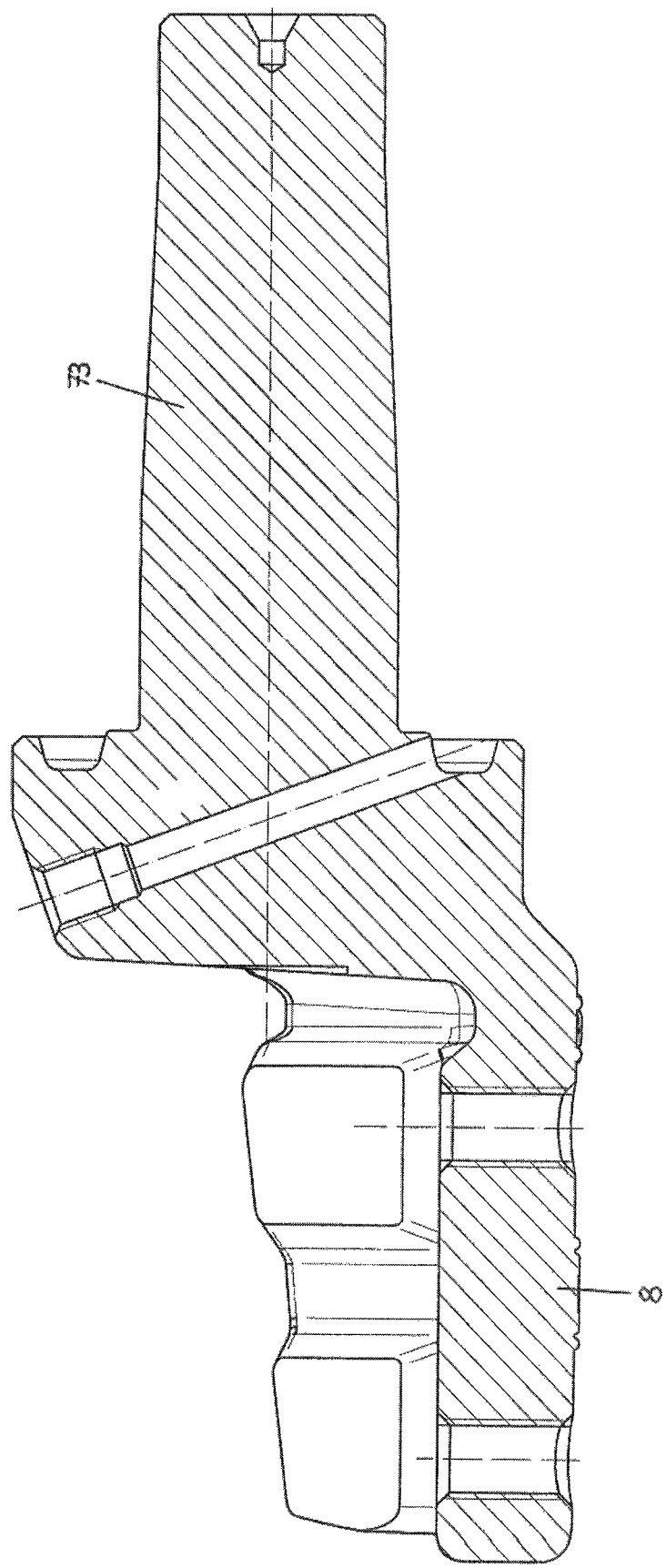
FIG. 3A is a sectional view thereof.

The design of the bearing journal 7 designed with the extension 8 can be seen once again from FIG. 3 and FIG. 3A. Since the carrying beam 2 has as a solid profile a hexagonal cross section, the inner face of the trough-shaped extension 8 is correspondingly designed to be approximately trapezoidal in cross section.

Since, further, the extension 8 is offset with respect to the bearing journal 73 transversely to its axis, the center axis of the carrying beam 2 and the axis of rotation of the bearing journal 7 run approximately coaxially.

The invention claimed is:

1. A bearing unit assembly for a conveying installation for the transport of goods by way of an endless conveyor belt that is fastened to an underside of carrying beams oriented transversely with respect to a direction of movement of the conveyor belt and spaced apart from one another in the direction of movement of the conveyor belt, comprising:

carrying rollers mounted on bearing bolts at each of the two ends of the carrying beams, said carrying rollers rolling along two pairs of carrying ropes or carrying rails of the conveying installation defining a forward strand and a return strand of the conveyor belt;

said bearing bolt having an extension formed as an upwardly open trough releasably fastened to, and cradling, a respective end of a corresponding said carrying beam.

2. The bearing unit assembly according to claim 1, wherein said carrying beam has a hexagonal cross section, and an inner face of said upwardly open trough of said extension is approximately trapeze-shaped in cross section.

3. The bearing unit assembly according to claim 1, wherein said trough extension is offset with respect to said bearing journal such that a bearing axis and a center axis of said carrying beam are at least approximately coaxial.

4. The bearing unit assembly according to claim 1, which comprises one or a plurality of screw bolts connecting said end of said carrying beam to said trough extension.

* * * * *